(12) United States Patent
Fuechsel et al.

(10) Patent No.: US 9,488,219 B2
(45) Date of Patent: Nov. 8, 2016

(54) FLOATING BEARING FOR A STEERING GEAR

(71) Applicant: ZF LENKSYSTEME GMBH, Schwaebisch Gmuend (DE)

(72) Inventors: Dennis Fuechsel, Schwaebisch Gmuend (DE); Jens Hafermalz, Waeschenbeuren (DE)

(73) Assignee: Robert Bosch Automotive Steering GmbH, Schwaebisch Gmuend (DE)

( * ) Notice: Subject to any disclaimer, the term of this patent is extended or adjusted under 35 U.S.C. 154(b) by 72 days.

(21) Appl. No.: 14/381,782

(22) PCT Filed: Apr. 5, 2013

(86) PCT No.: PCT/EP2013/057184
§ 371 (c)(1),
(2) Date: Aug. 28, 2014

(87) PCT Pub. No.: WO2013/152996
PCT Pub. Date: Oct. 17, 2013

(65) Prior Publication Data
US 2015/0053034 A1    Feb. 26, 2015

(30) Foreign Application Priority Data
Apr. 12, 2012  (DE) .................. 10 2012 103 147

(51) Int. Cl.
*F16C 27/06*    (2006.01)
*B62D 5/04*    (2006.01)
(Continued)

(52) U.S. Cl.
CPC ............... *F16C 27/066* (2013.01); *B62D 3/12* (2013.01); *B62D 5/0409* (2013.01);
(Continued)

(58) Field of Classification Search
CPC  F16C 27/066; F16C 32/0688; F16C 27/063; F16H 2057/0222
USPC ............................................. 384/901
See application file for complete search history.

(56) References Cited

U.S. PATENT DOCUMENTS 3,071,419 A * 1/1963 Lower .................. F16C 33/08
384/295
3,554,619 A * 1/1971 Irwin .................. F16C 27/066
384/536

(Continued)

FOREIGN PATENT DOCUMENTS

DE   10 2005 035 020   2/2007
DE   10 2007 055 814   6/2009

(Continued)

*Primary Examiner* — William Kelleher
*Assistant Examiner* — Randell J Krug
(74) *Attorney, Agent, or Firm* — Jordan and Koda, PLLC

(57) ABSTRACT

A floating bearing for a steering gear, having an inner ring for receiving a pinion shaft of the steering gear and having an outer ring which surrounds the inner ring and which serves for the mounting of the floating bearing in a housing of the steering gear, wherein the outer ring and the inner ring form an annular gap between them and wherein the outer ring and the inner ring are connected to one another by means of at least one flexible connecting part such that said outer ring and inner ring are movable relative to one another in at least one radial direction, is characterized in that the outer ring and/or the inner ring form, within the connecting part, at least one projection which projects into the annular gap such that the spacing between the outer ring and inner ring is smaller in the region of the projection than in the remaining section of the annular gap.

17 Claims, 5 Drawing Sheets

(51) Int. Cl.
*F16H 57/039* (2012.01)
*B62D 3/12* (2006.01)
*F16H 57/021* (2012.01)
*F16H 57/022* (2012.01)
*F16H 57/12* (2006.01)
*F16H 55/24* (2006.01)

(52) U.S. Cl.
CPC ........... *F16H 57/039* (2013.01); *F16H 55/24* (2013.01); *F16H 2057/0213* (2013.01); *F16H 2057/0222* (2013.01); *F16H 2057/127* (2013.01); *Y10T 74/1967* (2015.01)

(56) References Cited

U.S. PATENT DOCUMENTS

| | | | | |
|---|---|---|---|---|
| 6,012,347 A * | 1/2000 | Hasegawa | ............ | B62D 5/0415 180/443 |
| 6,550,567 B2 * | 4/2003 | Murakami | ........... | B62D 5/0409 180/444 |
| 7,686,515 B2 * | 3/2010 | Schust | ..................... | B62D 3/12 384/215 |
| 8,555,741 B2 * | 10/2013 | Arlt | .......................... | B62D 3/12 74/388 PS |
| 8,667,858 B2 * | 3/2014 | Fuechsel | ............... | B62D 5/0409 384/535 |
| 2008/0199114 A1 * | 8/2008 | Schust | ..................... | B62D 3/12 384/220 |
| 2010/0260448 A1 * | 10/2010 | Hafermalz | ............... | B62D 3/12 384/215 |
| 2012/0272765 A1 * | 11/2012 | Fuechsel | ............... | B62D 5/0409 74/416 |
| 2013/0239726 A1 | 9/2013 | Fuechsel et al. | | |

FOREIGN PATENT DOCUMENTS

| | | | | |
|---|---|---|---|---|
| DE | 10 2008 041 112 | | 2/2010 | |
| DE | 102008041112 A1 * | | 2/2010 | ........... B62D 5/0409 |
| DE | 10 2010 003 313 | | 9/2011 | |

* cited by examiner

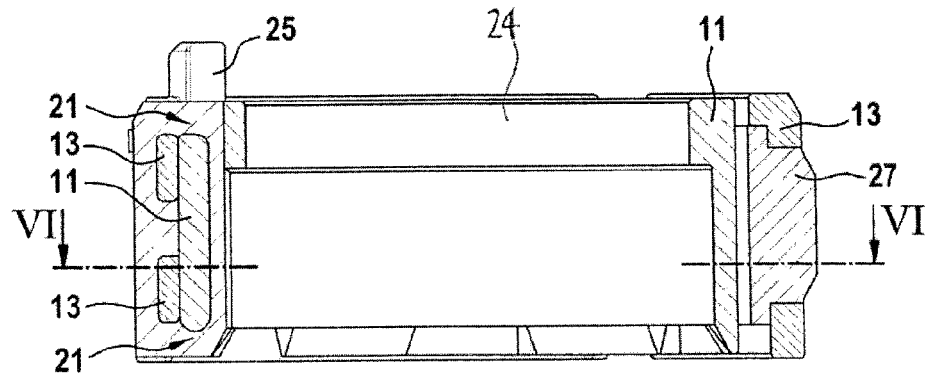
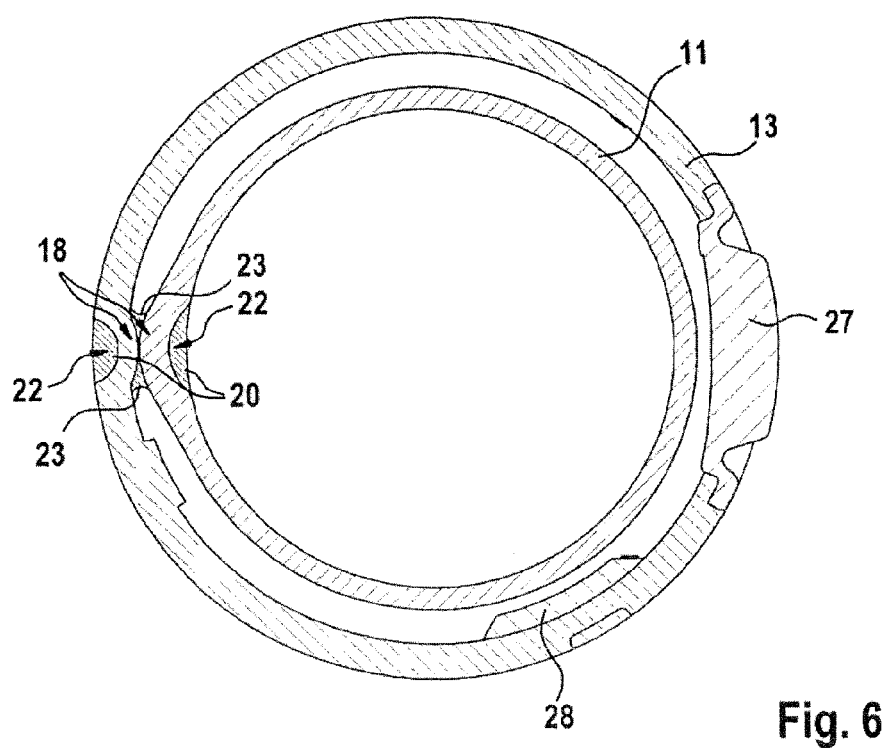
Fig. 5
Fig. 6

FLOATING BEARING FOR A STEERING GEAR

BACKGROUND OF THE INVENTION

The invention relates to a floating bearing for a steering gear.

In most motor vehicles, there are installed power steering systems which, during steering maneuvers, generate an assisting torque and thereby reduce the steering torque that has to be imparted to the steering column by the driver.

Known power steering systems are based on a steering gear which converts the drive power of a hydraulic or electric drive and transmits said drive power to the steering column. Steering gears of said type are generally in the form of a helical rolling-type gear, and are in particular in the form of a helical wheel gear or worm gear, that is to say said steering gears comprise a gearwheel, which is connected directly or indirectly to the steering column, and a pinion which is driven by the drive via a pinion shaft.

In the case of such steering gears, gearing play has proven to be a problem, said gearing play arising owing to component tolerances, different thermal expansion of the gearing elements and wear. In particular during so-called alternating steering, that is to say during directly successive steering maneuvers with alternating steer angle, such gearing play generates undesired noises resulting from alternating abutment of opposite flanks of teeth of the pinion and gearwheel.

It is known for said gearing play to be eliminated by virtue of the pinion shaft being mounted so as to be pivotable about an axis running perpendicular to the longitudinal axis of the pinion shaft and at a distance from the toothing engagement of pinion and gearwheel, and being pressed against the gearwheel by means of one or more spring elements. Here, the pivoting capability of the pinion shaft is integrated into one of the two bearing arrangements by which the pinion shaft is mounted at its ends. Said bearing arrangement is also referred to as "fixed bearing". The bearing arrangement in the region of the other end is then implemented with play (so-called "floating bearing") in order to permit the deflection caused by the pivoting movement. The fixed bearing is generally provided at the drive side, whereas the floating bearing is provided on the free end of the pinion shaft. The one or more spring elements for pressing the pinion against the gearwheel are generally integrated into the floating bearing.

A (generic) floating bearing of said type, and a steering gear comprising a floating bearing of said type, are known for example from DE 10 2007 055 814 A1. In said document, the floating bearing comprises an inner ring, within which a section of a pinion shaft of the steering gear is mounted with the interposition of a rolling bearing, and an outer ring, which is held in a receptacle of a housing of the steering gear. The inner ring and outer ring form an annular gap between them. At one point on the circumference, the inner ring and the outer ring are connected via a connecting part which is in the form of a web and which is formed from an elastic material. The annular gap permits a radial movement of the inner ring and outer ring relative to one another, whereas the connecting part ensures that the inner ring and outer ring are held together, without the desired radial mobility between these being impeded.

A disadvantage of the floating bearing known from DE 10 2007 055 814 A1 is the relatively high forces required for a relative displacement of the inner ring with respect to the outer ring as a result of the deformation of the connecting part.

Taking this prior art as a starting point, the invention was based on the object of specifying an improved floating bearing for a steering gear. In particular, the improved floating bearing should be distinguished by the fact that only relatively low forces are required for the relative movement of the inner ring with respect to the outer ring.

SUMMARY OF THE INVENTION

Said object is achieved by means of a floating bearing according to independent patent claim 1. The coordinate patent claim 9 relates to a steering gear comprising a floating bearing of said type. Advantageous embodiments of the floating bearing according to the invention and of the steering gear according to the invention are the subject of the respective dependent patent claims, and emerge from the following description of the invention.

The invention is based on the concept of improving a generic floating bearing, in particular with regard to the forces that must be imparted for the relative movement of inner ring with respect to outer ring, by virtue of the connecting part via which the inner ring is movably connected to the outer being of articulated form, such that the relative movement is based substantially on a rolling or sliding motion of the inner ring and outer ring on one another. The guidance of the relative movement is thus performed by the inner ring and the outer ring themselves. The use of a flexible material, from which the entire connecting part is formed in the case of the floating bearing as per DE 10 2007 055 814 A1, can thus be reduced to a sleeve which, essentially, need merely ensure that the inner ring and outer ring are held together, and which can be distinguished by low deformation forces.

This basic concept of the invention is implemented in structural terms in that a generic floating bearing for a steering gear, said floating bearing having an inner ring for (directly or indirectly) receiving a pinion shaft of the steering gear and having an outer ring, which surrounds the inner ring, for the mounting of the floating bearing in a housing of the steering gear, wherein the outer ring and the inner ring form an annular gap between them, and wherein the outer ring and the inner ring are connected to one another by way of at least one flexible connecting part so as to be movable relative to one another in at least one radial direction, is improved in that the outer ring and/or the inner ring form(s), within the connecting part, a (at least one) projection which projects into the annular gap such that the spacing between outer ring and inner ring is smaller in the region of this projection then in the remaining section of the annular gap.

Here, the projection may preferably have a (two-dimensionally or three-dimensionally) curved surface profile.

In a preferred refinement of the floating bearing according to the invention, it may furthermore be provided that the inner ring and the outer ring each form a (at least one) projection, said projection being situated radially opposite one another.

It may preferably be provided that the inner ring and the outer ring are partially or entirely surrounded by a flexible, and preferably elastic, material (for example elastomer) in the region of the projection. The flexible material may in particular form a sleeve which surrounds the inner ring and the outer ring in the region of the projection or projections, which sleeve ensures that the inner ring and outer ring are held together but at the same time impedes the relative movement between these to the least possible extent.

A "flexible material" is to be understood to mean a material which can be deformed by forces (considerably)

lower than the forces that would cause the inner ring and the outer ring to be correspondingly deformed. In particular, the functional deformability of the "flexible material" is realized under the action of forces which, in the case of generic steering gears, lead to pivoting of the pinion shaft and to the resulting relative movement of inner ring and outer ring.

An "elastic material" is to be understood to mean a material whose modulus of elasticity is (considerably) lower than the modulus (moduli) of elasticity of the material(s) of the inner ring and outer ring. In particular, the modulus of elasticity of the "elastic material" is so low that, under the action of forces that cause pivoting of the pinion shaft in the case of generic steering gears, said elastic material leads to the functional deformation and to the relative movement, which is permitted as a result, of the inner ring and outer ring.

In a further preferred embodiment of the floating bearing according to the invention, it may be provided that the inner ring (preferably on its inner side) and/or the outer ring (preferably on its outer side) form(s) the at least one depression in which the flexible material is arranged. In this way, it is firstly possible for a positively locking connection to be formed between the inner and/or outer ring and the flexible material itself, which positively locking connection has the effect that the inner ring and outer ring are held together in an improved manner. Furthermore, by means of the arrangement of the flexible material in the depressions, the integration of the floating bearing into the housing of the steering gear can be simplified, in particular if—as is preferably provided—the flexible material does not protrude beyond the edge of the depression(s).

It may preferably be provided that the inner ring and the outer ring of the floating bearing according to the invention make contact in the region of the projection or projections, whereby said inner ring and outer ring roll or slide directly on one another during the relative movement.

It is however also possible for a (thin) layer of flexible material, which may also be the same material as that which surrounds the inner ring and the outer ring, to be provided in the region of the projection between the inner ring and the outer ring. Here, the thickness of said layer at its thinnest point, which is the point at which the spacing between the inner ring and the outer ring is at its smallest, it is preferably at most 0.5 mm, particularly preferably at most 0.3 mm. Depending on the flexible material, a layer of said type can reduce the friction between the inner and outer rings, which then roll or slide only indirectly on one another. A thin layer of said type can be produced in a simple manner by virtue of the sleeve that surrounds the inner and outer ring being produced by way of an insert molding process with the flexible material, wherein—owing to play between the inner ring and outer ring and/or owing to a deformation of the outer ring and/or inner ring under the pressures that prevail during the injection molding process—the spacing corresponding to the layer thickness is set between the inner ring and outer ring in the region of the one or more projections.

A steering gear according to the invention comprises at least one gearwheel, a pinion that meshes with said gearwheel, and a pinion shaft that comprises the pinion, wherein the pinion shaft is mounted, on one side of the pinion, in a fixed bearing which forms for the pinion shaft a pivot axis lying perpendicular to the longitudinal axis of the pinion shaft, and wherein the pinion shaft is mounted, on the other side of the pinion, in a floating bearing according to the invention.

In a preferred embodiment of the steering gear according to the invention, the inner ring and/or the outer ring have/has at least one projection which, for the preferably positive positioning of the floating bearing in a housing of the steering gear, engages into a depression, which is preferably of complementary form, of the housing. Here, it is particularly preferably provided that the projection extends in the axial direction of the inner ring or of the outer ring. The production of the depression, which is complementary thereto, in the housing can thus be simplified.

The invention will be explained in more detail below on the basis of an exemplary embodiment illustrated in the drawings.

BRIEF DESCRIPTION OF THE DRAWINGS

FIG. 5 shows the floating bearing of FIG. 4 in a longitudinal section along the section plane V-V in FIG. 4;

FIG. 6 shows the floating bearing of FIGS. 4 and 5 in a radial section along the section plane VI-VI in FIG. 5.

DETAILED DESCRIPTION OF THE PREFERRED EMBODIMENTS

Figure 1:
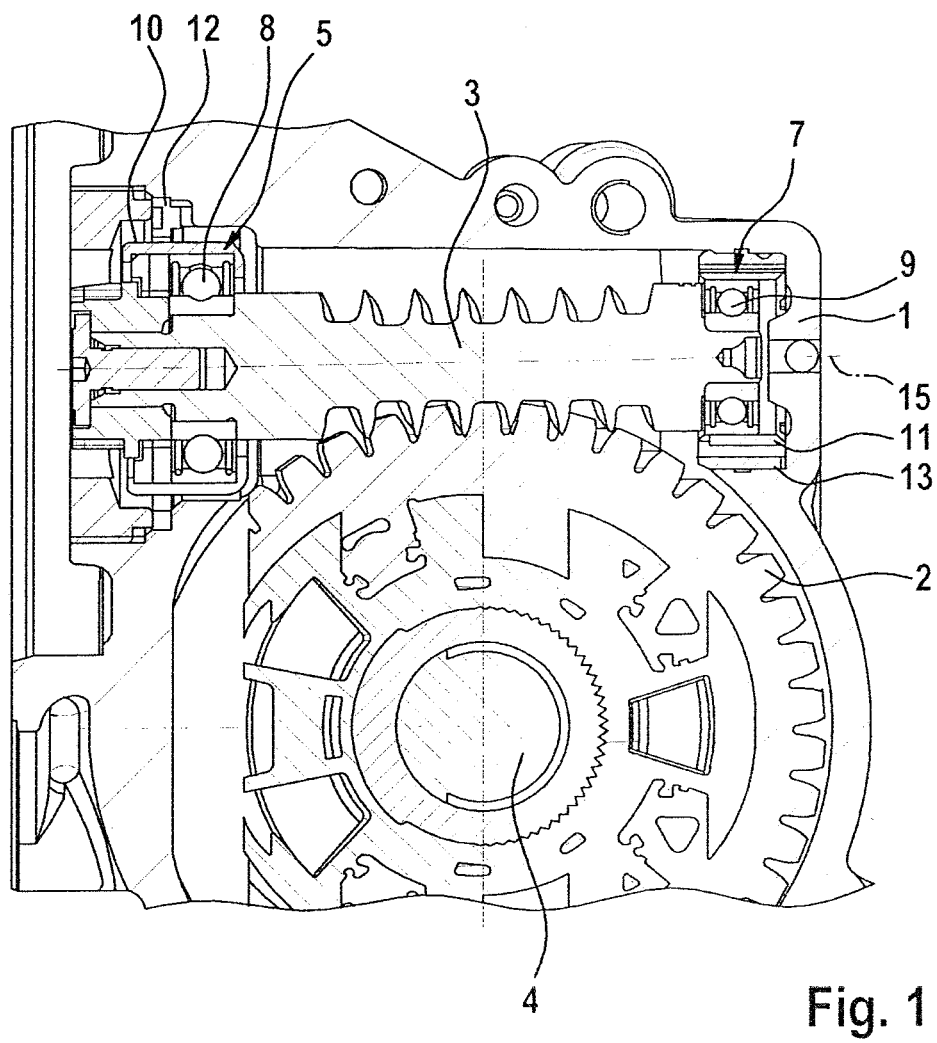
FIG. 1 shows a steering gear according to the invention in a first cross section.
Figure 2:
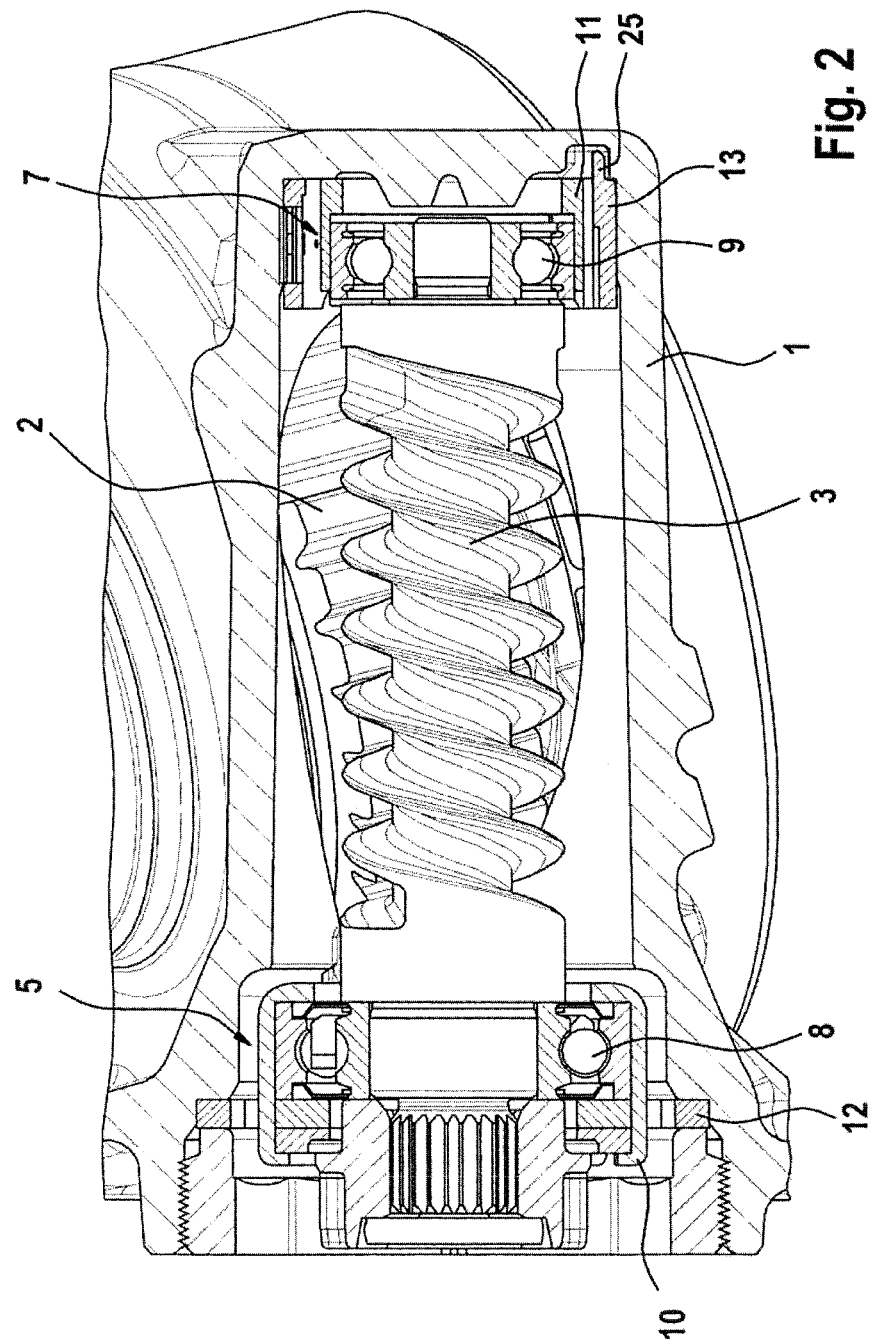
FIG. 2 shows the steering gear from FIG. 1 in a second cross section.

FIGS. 1 and 2 show the main constituent parts of an embodiment of a steering gear according to the invention. Said steering gear comprises a housing 1, within which there are mounted a gearwheel 2 and a pinion that meshes with the gearwheel 2. The pinion and a pinion shaft that comprises the pinion are configured integrally in the form of a worm 3.

The gearwheel 2 is fastened fixedly to a steering column 4 of a motor vehicle (not illustrated).

The worm 3 has a drive-side end by which it can be connected to the drive output shaft of a drive (for example electric motor) that is not illustrated. In the region of said drive-side end, the worm 3 is mounted in the housing 1 by way of a first bearing arrangement. Said bearing arrangement comprises a fixed bearing 5 which allows the worm 3 to pivot about a pivot axis 6.

Said pivoting causes a deflection of the free end, situated opposite the drive-side end, of the worm 3, said worm being mounted at said free end by means of a second bearing arrangement in receptacle of the housing 1. The second bearing arrangement comprises a floating bearing 7 according to the invention, which is designed so as to permit the deflection of the free end of the worm 3.

The bearing arrangements of the worm 4, both in the region of the fixed bearing 5 and also in the region of the floating bearing 7, comprise a respective rolling bearing 8, 9, in which the corresponding sections of the worm 3 are mounted substantially without play. The rolling bearings 8, 9 themselves are mounted in a respective inner ring 10, 11 of the fixed bearing 5 and of the floating tearing 7 respectively. The fixed bearing 5 and floating bearing 7 furthermore comprise a respective outer ring 12, 13 surrounding the associated inner ring 10, 11, which outer rings are in turn arranged substantially without play in a respective corresponding receptacle of the housing 1. The connection between the inner ring 10, 11 and the associated outer ring 12, 13 is implemented in structural terms such that—in the case of the fixed bearing 5—said connection permits the pivoting of the worm 3 about the pivot axis 6 and—in the case of the floating bearing 7—said connection permits the deflection of the free end of the worm 3.

For this purpose, in the case of the fixed bearing 5, the outer ring 12 is connected to the inner ring 10 via two webs 14 (composed for example of spring steel), wherein the two webs 14 run substantially collinearly and thus form the pivot axis 6 about which the outer ring 12 can be pivoted relative to the inner ring 10. Here, the webs 14 and thus the pivot axis 6 run not through the center of the fixed bearing 5 but so as to be radially offset relative thereto (cf. FIG. 3). The pivot axis 6 thus does not intersect the longitudinal axis 15 of the worm 3.

Figure 3:
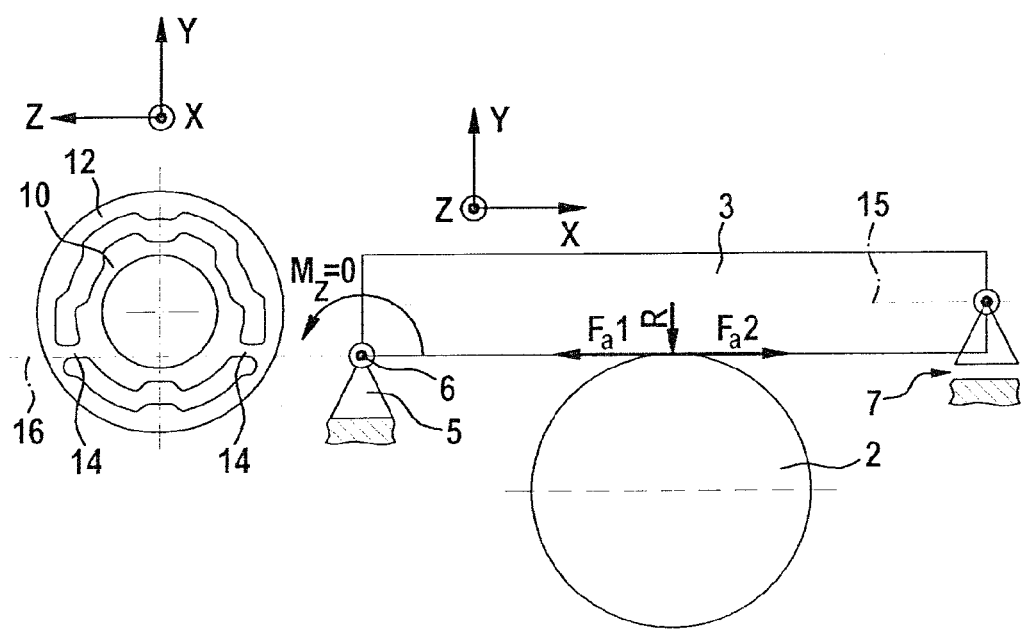
FIG. 3 shows the function of the steering gear of FIGS. 1 and 2 in a schematic illustration.

Owing to said radial offset of the webs 14 with respect to the centre of the fixed bearing 5, the pivot axis 6 is relocated into the vicinity of the outer circumference of the pinion of the worm 3, whereby the generation of reaction moments ($M_z$), such as arise or would arise owing to the toothing forces ($F_{a1}$, $F_{a2}$) acting at the toothing engagement between pinion and gearwheel in conjunction with the spacing between the line of action of the toothing forces ($F_{a1}$, $F_2$) and the pivot axis 6, can be reduced or eliminated. For the most complete possible elimination of the reaction moments ($M_z=0$), it is provided that the pivot axis 6 lies within the tangential plane formed at the contact point between the two pitch circles or rolling circles of gearwheel 2 and pinion ("toothing engagement" 16), as is schematically illustrated in FIG. 3.

Figure 4:
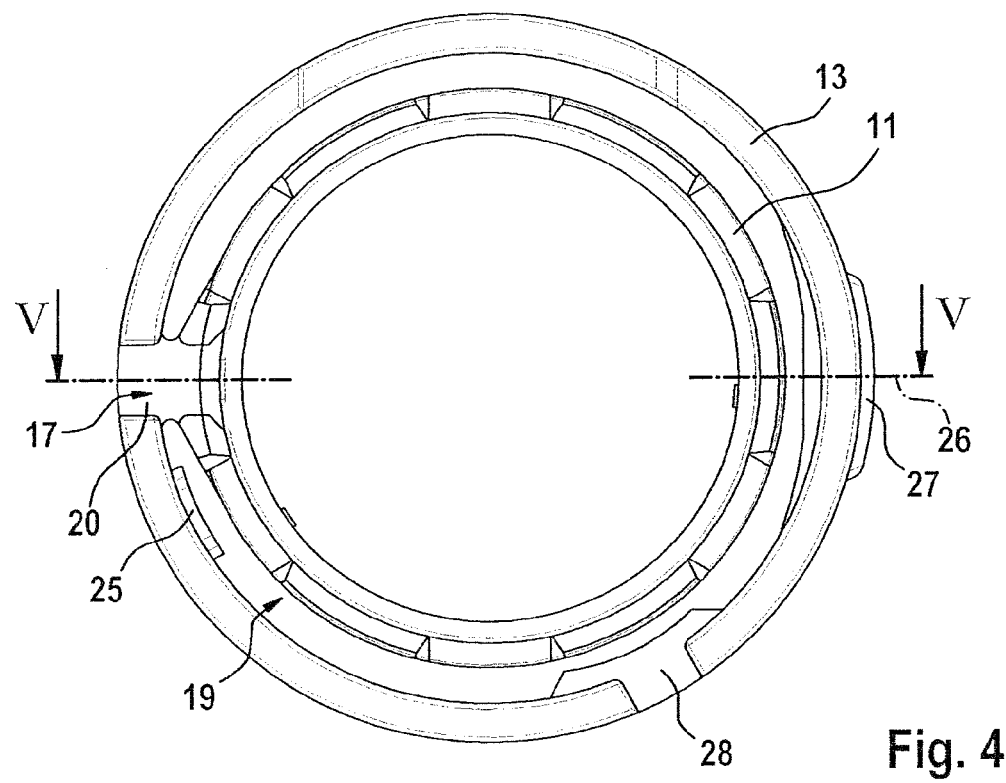
FIG. 4 shows, in a plan view, the floating bearing used in the steering gear of FIGS. 1 and 2.

FIGS. 4 to 6 show the floating bearing 7 according to the invention of the steering gear on its own. A main function of the floating bearing 7 is that of mounting the worm within the housing 1 in such a manner as to ensure the movement (deflection) of the free end of the worm 3 owing to the pivoting of the latter about the pivot axis 6 formed in the fixed bearing 5. For this purpose, in unloaded neutral position of the floating bearing 7, the inner ring 11 is arranged concentrically within the outer ring 13 with a substantially constant spacing. In one section, the inner ring 11 is connected to the outer ring 13 via a radially running connecting part 17. In the region of the connecting part 17, and as viewed in radial section (cf. FIG. 6), the inner ring 11 and the outer ring 13 have a respective projection 18 running in curved fashion, which projections project—opposite one another—into the annular gap 19 formed between the inner ring 11 and the outer ring 13. Here, the tips of the two projections 18 make contact.

In the region of the projections 18, the inner ring 11 and the outer ring 13 are surrounded by an elastomer sleeve 20. Here, the elastomer sleeve 20 is configured so as not to protrude beyond the outer surfaces of the inner ring 11 and outer ring 13. For this purpose, it is provided firstly that the axial length of the inner ring 11 and of the outer ring 13 is smaller in the region of the projections 18 than in the remaining sections. In this way, depressions 21 are formed in which the elastic material of the elastomer sleeve 20 is received (cf. FIG. 5). The ring 13 is furthermore provided, in the middle of its axial length, with a radial opening in which the material of the elastomer sleeve likewise arranged (cf. FIG. 5). FIG. 6 furthermore shows that the inner ring 11, on its inner side that receives the worm 3, and the outer ring 13, on its outer side by which the floating bearing 7 is mounted in the associated receptacle of the housing 1, each form a further depression 22 which runs in the axial direction and in which the material of the elastomer sleeve 20 is likewise received. Owing to the arrangement of the material of the elastomer sleeve 20 in the depressions 21, 22, it is possible to prevent said material from protruding beyond the correspondingly adjacent regions of inner ring 11 and outer ring 13, whereby the integration of the floating bearing 7 into the steering gear is simplified.

It is also the case in the region of the annular gap 19 that the projections 18 are surrounded on both sides (in the circumferential direction) by elastic material 23. Said elastic material is preferably the same material as that from which the elastomer sleeve 20 is formed. The elastic material 23 in the region of the annular gap 19 has noise effect, in conjunction with the elastomer sleeve 20, of holding the inner ring 11 and outer ring 13 together. The elastomer sleeve 20 and the elastic material 23 arranged in the annular gap 19, can be produced in one working step, for example by (two-component) injection molding.

The connecting part 17 forms a pivot joint with a low pivoting moment, which allows the outer ring 13 to pivot relative to the inner ring 11 about a pivot axis lying in the region of the connecting part 17. During said pivoting movement, the outer ring 13 and the inner ring 11 slide or roll on one another in the sections that make contact, while the elastomer sleeve 20 and the elastic material 23 provided in the annular gap 19 do not significantly impede said relative movement of outer ring 13 and inner ring 11 but at the same time ensure that said outer ring and inner ring are held together.

The inner ring 11 of the floating bearing 7 also has a collar 24. Said collars serves for the axial positioning of the rolling bearing 9, and thus of the worm 3, in the housing 1.

Furthermore, the outer ring 13 of the floating bearing 7 also has, at one point on its circumference, a positioning projection 25 that protrudes in an axial direction. Said positioning projection engages into a corresponding recess of the housing 1 (cf. FIG. 2). Positive positioning of the floating bearing 7 in the housing 1 is ensured in this way. Furthermore, the positioning projection prevents rotation of the outer ring 13 in the housing 1.

Provision is made for the floating bearing 7 to be integrated into the housing 1 of the steering gear such that the pivoting of the worm 3 about the pivot axis 6 formed in the fixed bearing 5 leads to a displacement of the inner ring 11 relative to the outer ring 13 in a direction substantially perpendicular to the radial axis 26 extending through the connecting part 17. By contrast, in the direction perpendicular to said direction, that is to say in the direction of the radial axis 26, extending through the connecting part 17, of the floating bearing 7, there should be as far as possible no possibility for displacement of the outer ring 13 with respect to the inner ring 11, in order to prevent interlocking of the pinion of the worm 3 on the gearwheel 2 during operation of the steering gear. This is achieved in that the spacing between the inner ring 11 and the outer ring 13 in that section of the floating bearing 7 which situated radially opposite the connecting part is restricted to a small dimension of for example 0.1 mm, and at most 0.5 mm, and preferably at most 0.3 mm. This is achieved by means of a delimiting element 27 which is mounted within the outer ring 13 so as to be displaceable in the radial direction. The delimiting element 27 has a radial width greater than the radial width of the outer ring 13, wherein, in the ease of a floating bearing 7 that has not yet been installed in the housing 1, the delimiting element 21 can be displaced so far outward that it protrudes beyond the outer surface of the outer ring 13. In this way, a relatively large spacing is set between the outer side of the inner ring 11 and the delimiting element 27. Said spacing is reduced to the desired small dimension during the installation of the floating bearing 7 in the housing 1 because then, as a result of a collision with the housing 1, the delimiting element 27 can no longer protrude beyond the outer surface of the outer ring 13, and must consequently be displaced in the direction of the inner ring 11.

The outer ring 13 of the floating bearing 7 furthermore comprises an elastic abutment element 28 which restricts a movement of the inner ring 11 during a pivoting movement or the worm 3 in one direction (upward in FIG. 1). Said elastic abutment element 28, which may for example be in the form of a metal spring or in the form of a combination of metal spring and elastomer spring, may also be integrated into the inner ring 11.

The steering gear according to the invention realizes compensation of gear play such as arises in particular owing to manufacturing tolerances of the components of the steering gear, owing to different thermal expansions of said components and owing to wear. Said gearing play compensation is achieved by virtue of the worm 3 being mounted in pivotable fashion and being pressed against the gearwheel 2 under spring loading. The spring load is realized—in the same way as the formation of the pivot axis 6—in particular by the webs 14 of the fixed bearing 5, which webs are twisted, and thus act functionally as torsional spring bars, as a result of the relative rotation of outer ring 12 with respect to the inner ring 10. To attain a spring preload sufficient to compensate for the increasing level of wear over the service life of the steering gear, provision is made for the worm 3 to be equipped with a relatively large pivot angle in the newly manufactured state of the steering gear. For this purpose a provision is made for an the worm 3 to be integrated into the housing 1 such that the longitudinal axis 15 of said worm has a slightly smaller spacing to the toothing engagement 16, or to the line of action of the toothing forces ($F_{a1}$, $F_{a2}$), in the region of the fixed bearing 5 than in the region of the floating bearing 7 (cf. FIG. 1). This offset is realized by means of a corresponding offset of the inner ring 10 with respect to the outer ring 12 of the fixed bearing 5; these are thus arranged so as not to be exactly concentric. It is made possible in this way for the fixed bearing 5 and the floating bearing 7, despite the pivot angle provided, be arranged in concentrically arranged receptacles of the housing 1. The manufacture of the housing 1 can be simplified in this way.

LIST OF REFERENCE NUMERALS

1 Housing
2 Gearwheel
3 Worm
4 Steering column
5 Fixed bearing
6 Pivot axis
7 Floating bearing
8 Rolling bearing
9 Rolling bearing
10 inner ring of the fixed bearing
11 Inner ring of the floating bearing
12 Outer ring of the fixed bearing
13 Outer ring of the floating bearing
14 Web
15 Longitudinal axis of the worm
16 Toothing engagement
17 Connecting part
18 Projection
19 Annular gap
20 Elastomer sleeve
21 Depression
22 Depression
23 Elastic material
24 Collar
25 Positioning projection

The invention claimed is:

1. A floating bearing for a steering gear, having an inner ring for receiving a pinion shaft of the steering gear and having an outer ring, which surrounds the inner ring, for the mounting of the floating bearing in a housing of the steering gear,
   wherein the outer ring and the inner ring form an annular gap between them,
   wherein the outer ring and the inner ring are connected to one another by way of at least one connecting part, distinct from the inner ring and the outer ring, so as to be movable relative to one another in at least one radial direction,
   wherein the outer ring and/or the inner ring form, embedded within the connecting part, at least one projection distinct from the connecting part which projects into the annular gap such that the spacing between outer ring and inner ring is smaller in the region of the projection than in the remaining section of the annular gap; and
   wherein the connecting part comprises a flexible material which surrounds the at least one projection and the inner ring and outer ring in a region of said at least one projection.

2. The floating bearing according to claim 1, wherein the at least one projection has a curved surface profile.

3. The floating bearing as claimed in claim 1, wherein the inner ring and the outer ring each form one of said at least one projection, said projections being situated radially opposite one another.

4. The floating bearing as claimed in claim 1, wherein the inner ring and the outer ring make contact in the region of the projection.

5. The floating bearing as claimed in claim 1, wherein a layer of a flexible material is provided between the inner ring and the outer ring in the region of the projection.

6. The floating bearing as claimed in claim 5, wherein a smallest spacing between the inner ring and outer ring, and thus a smallest thickness of the layer of flexible material, is at most 0.5 mm.

7. The floating bearing as claimed in claim 5, wherein a smallest spacing between the inner ring and outer ring, and thus a smallest thickness of the layer of flexible material, is at most 0.3 mm.

8. The floating bearing as claimed in claim 1, wherein said connecting part is a sleeve.

9. A steering gear having a gearwheel, having a pinion that meshes with said gearwheel, and having a pinion shaft that comprises the pinion, wherein the pinion shaft is mounted, on one side of the pinion, in a fixed hearing which forms for the pinion shaft a pivot axis lying perpendicular to a longitudinal axis of the pinion shaft, and wherein the pinion shaft is mounted, on the other side of the pinion, in a floating hearing, wherein the floating bearing is designed as claimed in claim 1.

10. The steering gear as claimed in claim 9, wherein the inner ring and/or the outer ring have/has a positioning projection which, for the positioning of the floating bearing in a housing of the steering gear, engages into a depression of the housing.

11. The steering gear as claimed in claim 10, wherein the positioning projection extends in an axial direction of the inner ring and/or of the outer ring.

12. A floating hearing for a steering gear, comprising:
an inner ring for receiving a pinion shaft of the steering gear, the inner ring extending 360 degrees;
an outer ring, which surrounds the inner ring, for mounting the floating hearing in a housing of the steering gear, the outer ring extending 360 degrees;
a flexible connecting part distinct from the inner ring and outer ring and extending radially to overlay a first section of the inner ring and a first section of the outer ring, thereby connecting the inner ring and the outer ring at the flexible connecting part and allowing the inner ring and the outer ring to be movable relative to one another away from the first section of the inner ring and the first section of the outer ring; and
an annular gap between the inner ring and the outer ring; and
wherein at least one of the first section of inner ring and the first section of the outer ring comprises a projection, embedded within the flexible connecting part, which projects radially into the annular gap such that the spacing between outer ring and inner ring is smaller at the projection than at portions of the annular gap away from the first section of the inner ring and the first section of the outer ring; and
wherein the flexible connecting part surrounds said projection, said inner ring, and said outer ring, in a region of said projection.

13. The floating bearing as claimed in claim 12, wherein the inner ring, on its inner side, and/or the outer ring, on its outer side, form(s) a depression in which the flexible material is arranged.

14. The floating bearing as claimed in claim 12, wherein said flexible connecting part is a sleeve.

15. A floating bearing for a steering gear, comprising:
an inner ring for receiving a pinion shaft of the steering gear, the inner ring extending 360 degrees;
an outer ring separate from the inner ring and which surrounds the inner ring, the outer ring for mounting the floating bearing in a housing of the steering gear and extending 360 degrees;
a flexible connecting part distinct from the inner ring and outer ring and extending radially to overlay a first section of the inner ring and a first section of the outer ring; and
an annular gap between the inner ring and the outer ring; and
wherein at the first section of the inner ring a first convex projection is formed bulging toward the outer ring underlying the flexible connecting part;
wherein at the first section of the outer ring a second convex projection is formed bulging toward the inner ring underlying the flexible connecting part;
wherein the first convex projection and the second convex projection are separate and are configured to facilitate either one or both of a rolling motion and a sliding motion between the inner ring and the outer ring by having the first convex portion and the second convex portion extending into contact with each other; and
wherein the flexible connecting part is configured to hold the inner ring and outer ring together at said first convex projection and second convex projection.

16. The floating hearing as claimed in claim 15, wherein a depression is formed at a radially-outward side of the first section of the outer ring, and wherein the flexible connecting part occupies said depression.

17. The floating bearing as claimed in claim 15, wherein a depression is formed at a radially inward side of the first section of the inner ring, and wherein the flexible connecting part occupies said depression.

* * * * *